US012590267B2

(12) United States Patent
Haverly et al.

(10) Patent No.: US 12,590,267 B2
(45) Date of Patent: Mar. 31, 2026

(54) METHODS AND APPARATUS FOR PRODUCING BIODIESEL AND PRODUCTS OBTAINED THEREFROM

(71) Applicant: Renewable Energy Group, Inc., Ames, IA (US)

(72) Inventors: Martin Haverly, Ames, IA (US); David A. Slade, Ames, IA (US); Jared Downey, Iowa City, IA (US)

(73) Assignee: Renewable Energy Group, Inc., Ames, IA (US)

( * ) Notice: Subject to any disclaimer, the term of this patent is extended or adjusted under 35 U.S.C. 154(b) by 286 days.

(21) Appl. No.: 18/454,639

(22) Filed: Aug. 23, 2023

(65) Prior Publication Data

US 2024/0076575 A1 Mar. 7, 2024

Related U.S. Application Data

(60) Provisional application No. 63/401,012, filed on Aug. 25, 2022.

(51) Int. Cl.
*C11C 3/02* (2006.01)
*C10L 1/02* (2006.01)

(52) U.S. Cl.
CPC ................ *C11C 3/02* (2013.01); *C10L 1/026* (2013.01); *C10L 2200/0476* (2013.01); *C10L 2200/0484* (2013.01)

(58) Field of Classification Search
CPC . Y02E 50/10; C11C 3/003; C11C 3/02; C10L 1/026; C10L 2200/0476; C10L 2200/0484
See application file for complete search history.

(56) References Cited

U.S. PATENT DOCUMENTS

| | | | |
|---|---|---|---|
| 7,087,771 | B2 | 8/2006 | Luxem et al. |
| 8,581,013 | B2 | 11/2013 | Abhari et al. |
| 9,909,077 | B2 | 3/2018 | Slade et al. |
| 10,450,533 | B2 | 10/2019 | Slade et al. |
| 2012/0240452 | A1 | 9/2012 | Erdoes, Jr. et al. |

OTHER PUBLICATIONS

Search Report and Written Opinion for PCT/US2023/072784 dated Dec. 12, 2023.

*Primary Examiner* — Vishal V Vasisth
(74) *Attorney, Agent, or Firm* — Nyemaster Goode, P.C.

(57) ABSTRACT

Methods and apparatus for economically producing a biodiesel product from feedstocks. Some embodiments comprise using at least one of a crude feedstock pretreatment process and a free fatty acid refining process prior to transesterification and the formation of crude biodiesel and glycerin. The free fatty acid refining process may include introducing the feedstock to glycerolysis to obtain a glycerolysis product then stripping the glycerolysis product to produce a fatty acid distillate and a stripped feedstock. The fatty acid distillate is recycled to the glycerolysis process to create more higher-molecular weight glycerides and the stripped feedstock (mostly di- and tri-glycerides) proceeds to transesterification to make biodiesel.

21 Claims, 8 Drawing Sheets

$$R_1 : FFA + FG \underset{k1_b}{\overset{k1_a}{\rightleftharpoons}} H_2O + MG$$

$$R_2 : FFA + MG \underset{k2_b}{\overset{k2_a}{\rightleftharpoons}} H_2O + DG$$

$$R_3 : FFA + DG \underset{k3_b}{\overset{k3_a}{\rightleftharpoons}} H_2O + TG$$

$$R_4 : DG + FG \underset{k4_b}{\overset{k4_a}{\rightleftharpoons}} MG + MG$$

$$R_5 : TG + FG \underset{k5_b}{\overset{k5_a}{\rightleftharpoons}} DG + MG$$

FIG. 4

METHODS AND APPARATUS FOR PRODUCING BIODIESEL AND PRODUCTS OBTAINED THEREFROM

CROSS REFERENCE TO RELATED APPLICATION

This application is based upon U.S. Provisional Application Ser. No. 63/401,012 filed Aug. 25, 2022, the complete disclosure of which is hereby expressly incorporated by this reference.

FIELD OF THE INVENTION

The present invention relates to efficiently processing low-cost feedstocks into high-quality biodiesel that meets multiple commercial biodiesel specifications. More particularly, the invention relates to a method of producing biodiesel having a glycerolysis step followed by a stripping step to separate unreacted free fatty acids (FFA) from glycerides wherein the unreacted free fatty acids are recycled back to the glycerolysis step and the glycerides proceed to transesterification.

BACKGROUND OF THE INVENTION

Biodiesel is a renewable, generally clean-burning, lower carbon, petroleum diesel replacement that enhances independence from imported petroleum, helps reduce greenhouse gas emissions, supports agriculture and rural economies, and creates jobs. While biodiesel provides many benefits, biodiesel production must be efficient in order to compete and remain economically viable.

In order to reduce costs and adapt to changing market conditions, many biodiesel producers seek to use lower cost (and subsequently higher FFA) feedstocks. However, lower cost feedstocks contain a variety of low-level impurities, which can negatively affect biodiesel quality. In other words, it is more difficult to produce high-quality biodiesel when feedstocks containing more contaminants or particulates are used. In general, high FFA feedstocks are difficult to process into biodiesel by base-catalyzed transesterification because the FFAs are converted to soaps, which leads to undesirable processing consequences (e.g., emulsion formation and increased catalyst costs), yield losses, and production rate downturns. Further, it is more difficult to meet the ever-changing biodiesel finished product quality standards when high FFA feedstocks are used. The current practice to ensure product consistency and consumer safety is to regulate biodiesel quality according to various commercial standards, including ASTM D6751, EN 14214, CAN/CGSB 3.524, and numerous customer-specific specifications. The aforementioned specifications require biodiesel to be produced with strict standards for many properties, including flash point, residual alcohol, water and sediment, kinematic viscosity, sulfated ash, oxidation stability, sulfur, copper strip corrosion, cetane number, cloud point, carbon residue, Acid Number, cold soak filterability, monoglycerides, total and free glycerin, phosphorous, 90% distillation temperature, calcium and magnesium, sodium and potassium, particulate contamination, and ester content. The 2012 revision of ASTM D6751 and D6751-12 introduced multiple biodiesel grades with different limits for Cold Soak Filtration test time and monoglyceride content, further increasing the importance of these two properties for customer acceptance of biodiesel. As specifications for biodiesel become more rigorous and demand for lower cost and non-food feedstocks increases, biodiesel producers need improved production processes that enhance production efficiency of new and/or low-cost feedstocks to remain competitive and economically viable.

Chemical inputs like catalysts are an expensive but necessary part of the biodiesel manufacturing process. Optimizing and ultimately reducing the catalysts and other reactants used is a desirable way to make the biodiesel production process more efficient as the cost of manufacturing components is reduced. Moreover, biodiesel manufacture allows some catalysts and other reactants to be recovered and reused, while others are converted into other chemicals and/or unable to be recovered and reused. Therefore, by optimizing and reducing chemical input and recovering output reactants for reuse, biodiesel producers can both reduce the cost and increase the efficiency of the biofuel manufacturing process.

Two methods of enabling the production of biodiesel from lower cost higher FFA feedstocks are FFA stripping and glycerolysis. FFA stripping is a distillation process where FFA is thermally separated from a feedstock, resulting in a lower FFA feedstock stream or source and a higher FFA distillate stream. FFA stripping is often characterized by high temperatures and low pressures where FFA is encouraged to vaporize out of the feed stream. These conditions also encourage vaporization and carryover of monoglycerides (MG) out of the feed stream. MG carryover is undesirable because MG vapors derate or reduce the vapor capacity of the fatty acid distillation column and consequently, demand increased heat input. However, some MG vapor carryover is unavoidable while MG are present in the feedstock due to the similar boiling points of FFA and MG.

Another primary method of FFA reduction is glycerolysis, where FFA is reacted with glycerol, resulting in a product stream characterized by lower FFA. The glycerol reactant can originate from an external source and be dose to the high-FFA feedstock and/or native to the feedstock stream. Available hydroxyl sites may also be present in the form of mono- and diglycerides present in the original feedstock composition. Due to the over-abundance of glycerol in the reactor, the glycerolysis product may typically be characterized by a relatively high MG concentration relative to conventional fat, oil, and grease feedstocks. The artificially high concentration of MG generally renders glycerolysis product streams undesirable as feeds for FFA stripping. Therefore, there is a need for a more efficient and economical biodiesel production process capable of producing quality biodiesel with low cost feedstocks.

SUMMARY

One embodiment of the invention relates to a method of refining feedstock in a biodiesel production process. The method comprises introducing the feedstock into a first processing unit to undergo a glycerolysis process and a separation process such as FFA stripping. The output stream from the first processing unit is then introduced to a second processing unit, which another of a glycerolysis process and a separation process. The glycerolysis process converts FFA and glycerol into a glycerolysis product having a mixture of mono-, di-, and tri-glycerides, as well as unreacted FFA and glycerin. The separation process separates the glycerolysis product into a stripped feedstock stream rich in di- and tri-glycerides and a fatty acid distillate stream rich in FFAs and MG. The fatty acid distillate is then introduced to the glycerolysis process to convert the FFAs and MG into di- and tri-glycerides. The method continues as a loop, with the fatty acid distillate recycled upstream to the glycerolysis process until di- and tri-glycerides are produced and separated into the stripped feedstock stream.

Another embodiment of the invention relates to a method of refining feedstock in a biodiesel production process. The method comprises introducing the feedstock stream to a glycerolysis process, which converts the FFA in the feedstock into a glycerolysis product. The glycerolysis product includes at least some unreacted FFA and glycerin, as well as mono-, di-, and tri-glycerides. The glycerolysis product is then introduced to a separation process, such as an FFA stripping process, which separates the glycerolysis product stream into a refined feedstock containing di- and tri-glycerides and a fatty acid distillate containing FFAs and MG. The fatty acid distillate is recycled upstream to the glycerolysis process or introduced to a subsequent glycerolysis process to convert additional FFA and MG into di- and tri-glycerides. In some embodiments, the glycerolysis process is "starved" by introducing less glycerin than required to convert all of the FFAs and MG to di- and tri-glycerides. Starving the glycerolysis reaction helps increase the production of di- and tri-glycerides while minimizing the amount of MG produced.

Another aspect of the invention relates to a method of refining feedstock in a biodiesel production process. The method includes removing free fatty acids from said feedstock in a first free fatty acid stripping process to produce a stripped feedstock and a fatty acid distillate. The stripped feedstock includes di- and tri-glycerides and continues through the process toward transesterification to make biodiesel. The fatty acid distillate includes FFA and MG. The fatty acid distillate is introduced to a glycerolysis process to convert the fatty acid distillate to a glycerolysis product having some unreacted FFAs as well as mono-, di-, and tri-glycerides. The glycerolysis product is then recycled upstream to the fatty acid stripping process or introduced to a subsequent fatty acid stripping process to once again separate the stream into a stripped feedstock and a fatty acid distillate. The stripped feedstock continues toward transesterification and the fatty acid distillate is again introduced to the glycerolysis process to further convert the unreacted FFA and MG into di- and tri-glycerides. In some embodiments, the glycerolysis process is "starved" by introducing less glycerin than required to convert all of the FFAs and monoglycerides to di- and tri-glycerides. Starving the glycerolysis reaction helps increase the production of di- and tri-glycerides while minimizing the amount of MG produced.

BRIEF DESCRIPTION OF THE DRAWINGS

The advantages of the technology described may be better understood by referring to the descriptions below with the accompanying drawings. The drawings are not to scale and represent exemplary configurations that depict general principles of the technology, which are not intended as an exhaustive description or as a limitation to the broader aspects of the invention. Dotted lines within the figures represent different embodiments which may be included as part of the process.

FIG. 4 is a depiction of the glycerolysis reaction network;

DETAILED DESCRIPTION

Figure 1:
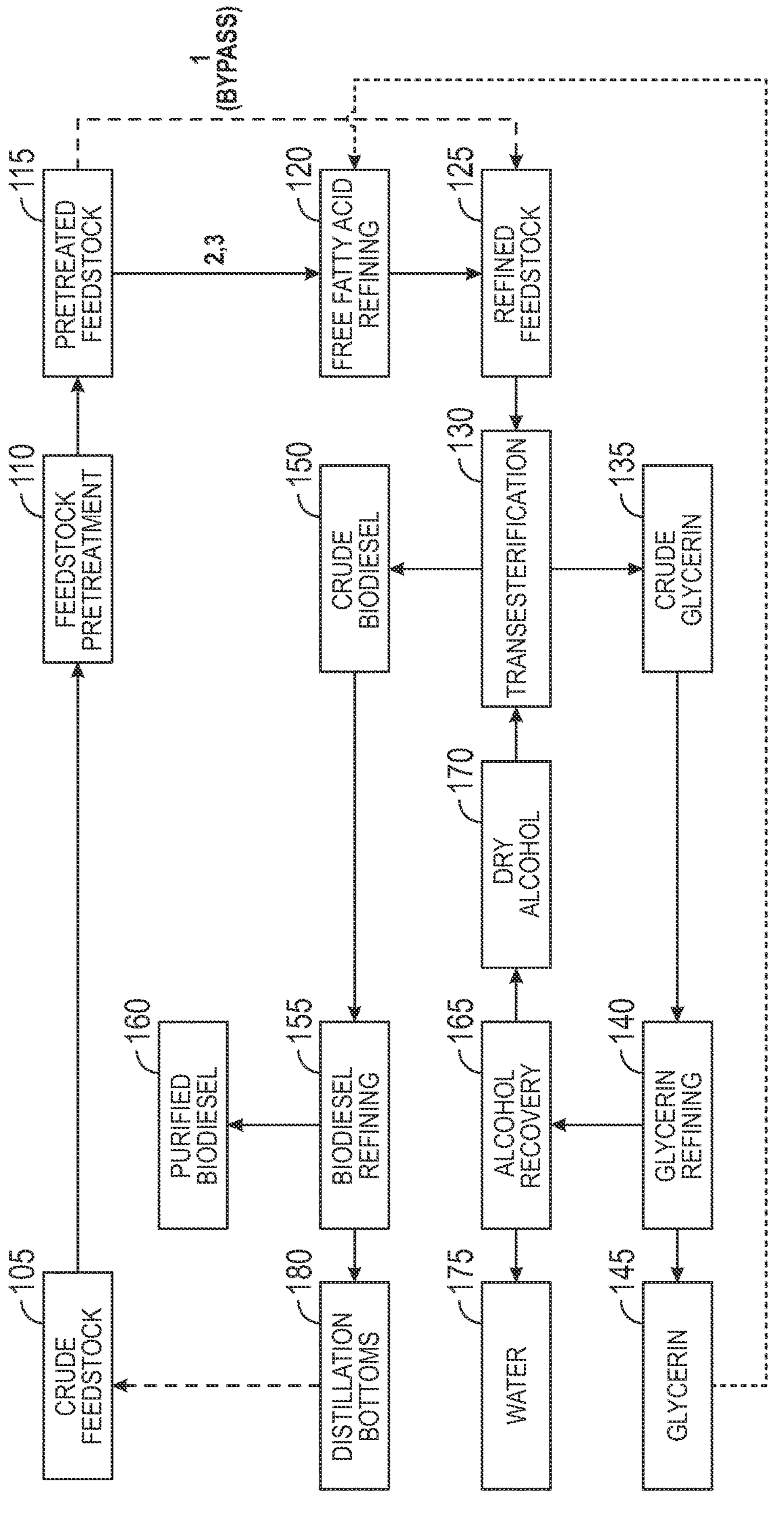
FIG. 1 is a process flow diagram showing several embodiments of methods for biodiesel production.

The apparatus, devices, systems, products, and methods of the present invention will now be described in detail by reference to various non-limiting embodiments, including the figures, which are exemplary only.

Unless otherwise indicated, all numbers expressing dimensions, capacities, and so forth used in the specification and claims are to be understood as being modified in all instances by the term "about." "About" will be understood by persons of ordinary skill in the art and will vary to some extent depending on the context in which it is used.

The present invention may be practiced by implementing process steps in different orders than as specifically set forth herein. All references to a "step" may include multiple steps (or substeps) within the meaning of a step. Likewise, all references to "steps" in plural form may be construed as a single process step or various combinations of steps.

The present invention may be practiced by implementing process units in different orders than as specifically set forth herein. All references to a "unit" may include multiple units (or subunits) within the meaning of a unit. Likewise, all references to "units" in plural form may be construed as a single process unit or various combinations of units.

As used in this specification and the appended claims, the singular forms "a," "an," and "the" include plural referents unless the context clearly indicates otherwise.

As used in this specification and the appended claims, the term "fats and oils" refers to any material of biological origin, both plant and animal, which is useful as a feedstock for making biodiesel. The feedstock may be in a crude form containing impurities and is considered a "crude feedstock" or "crude oil." On the other hand, the feedstock may be pretreated using other equipment to remove impurities. The pretreatment process may occur at a biodiesel production facility, at the source location, or both, producing a "pretreated feedstock" or "pretreated oil." The term "refined feedstock" refers to feedstocks having sufficiently low free fatty acid content to be used directly in transesterification. Refined feedstock may include crude alkyl esters. The term "free fatty acid" refers to aliphatic carboxylic acids having carbon chains with about 6 to about 24 carbon atoms. Free fatty acids may be found in fats and oils between 0 to 100 wt. % and are susceptible to forming esters upon reacting with an alcohol under esterification conditions. The term "ester" refers to organic esters, including mono-esters, di-esters, tri-esters, and more generally multi-esters. The term "biodiesel" describes a fuel comprised of fatty acid alkyl esters of long chain fatty acids derived from fats and oils. The term "alcohol" refers to an organic alcohol, including monohydric alcohols, dihydric alcohols, and polyhydric alcohols generally.

The term "Acid Number" refers to a common measurement of the amount of acid functional groups in the molecules in a sample. It specifically refers to the quantity of strong base (typically KOH) required to titrate the acid functional groups in a sample. Acid Number is conventionally expressed as milligrams of potassium hydroxide per gram of sample.

The term "sulfur" refers to the total quantity of sulfur in liquid fuels defined as mg/kg or parts per million (ppm). The term "unsaponifiables" refers to compounds in oils and fats that do not contain a fatty acid moiety that can be converted to an alkyl ester molecule and therefore can reduce the ester content and/or yield of biodiesel. The term "cold soak filterability tests" refers to test methods included in commercial specifications such as ASTM D7501, CAN/CGSB 3.524 appendix A, and EN 14214 that are used to evaluate the potential cold weather performance of biodiesel and biodiesel blends.

The term "glycerin" or "glycerol" or "free glycerin" refers to the molecule propane-1,2,3-triol (CAS Number 56-81-5). The term "crude glycerin" refers to streams consisting primarily of glycerin and dilute impurities such as methanol, salt, water, and organic matter not glycerin. The term "total glycerin" refers to glycerin present as one of either free glycerin or the glyceryl moiety bound to fatty acids as glycerides.

The methods of the invention can accommodate a wide range of feedstocks. In some embodiments of the invention, nonexclusive examples of feedstock are fats and oils including coconut oil, palm oils, palm kernel oil, cottonseed oil, rapeseed oil, peanut oil, olive oil, linseed oil, babassu oil, tea oil, Chinese tallow oil, olive kernel oil, meadowfoam oil, chaulmoogra oil, coriander oil, canola (rapeseed) oil, soybean oil, corn oil, camelina oil, castor oil, pennycress oil, lard oil, jatropha oil, sunflower oil, algae oils, used cooking oils, bacon grease, choice white grease, yellow grease, brown grease, poultry fat, beef tallow, lard, fish oils or combinations thereof. Additionally, feedstocks may include purified or distilled fats and oils including fatty acid distillates, such as palm fatty acid distillate, and others. Other feedstocks with a significant concentration of FFA, such as greater than about 1 wt. %, may also be suitable, such as acidulated soapstock. In some cases, distillation bottoms may be considered a low-grade crude feedstock, including bottoms from crude biodiesel distillation. Additional oils suitable for biodiesel production may be recovered from grain ethanol processes including corn oil, sorghum oil, wheat oil, and others, depending on the feedstock for the ethanol production process.

The invention relates generally to methods of refining feedstocks in a biodiesel production process by subjecting the feedstock to a glycerolysis process followed by a separation process, such as FFA stripping, before transesterification. Although the invention relates primarily to methods of refining feedstocks, this application also describes additional exemplary steps of a biodiesel production process.

An exemplary method 100 is described with reference to FIG. 1 for processing crude feedstock 105 into glycerin 145 and purified biodiesel 160 meeting commercial product specifications. The crude feedstock 105 arrives at the biodiesel production facility and is discharged into crude feedstock storage 105. Compatible feedstocks may be combined and stored in a shared tank before being processed. Crude feedstock 105 may first undergo a feedstock pretreatment process 110 that depends on its FFA content and other properties to produce a pretreated feedstock 115.

Figure 2:
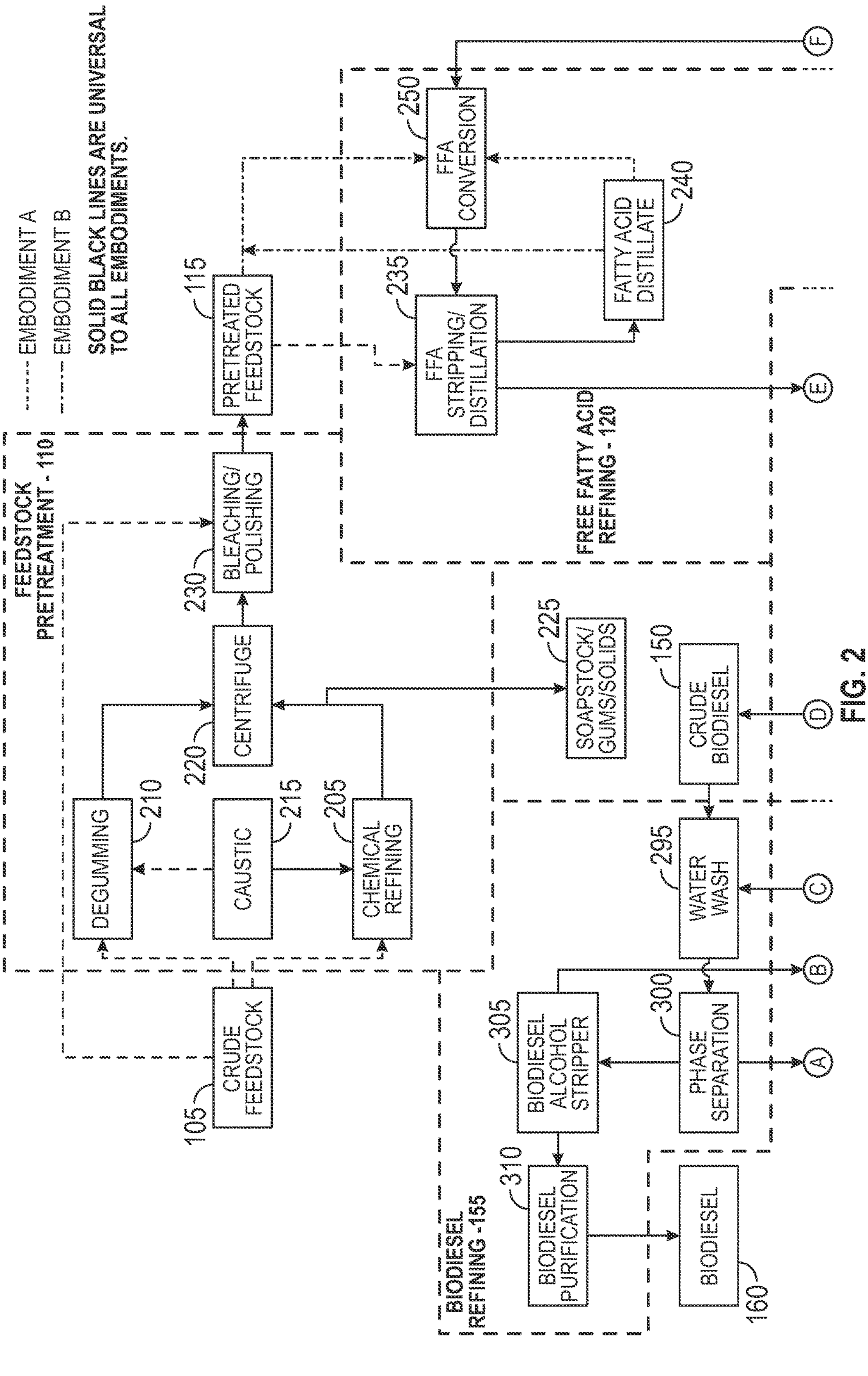
FIG. 2 is a process flow diagram showing more specific embodiments of the methods for biodiesel production shown in FIG. 1.
Figure 2:
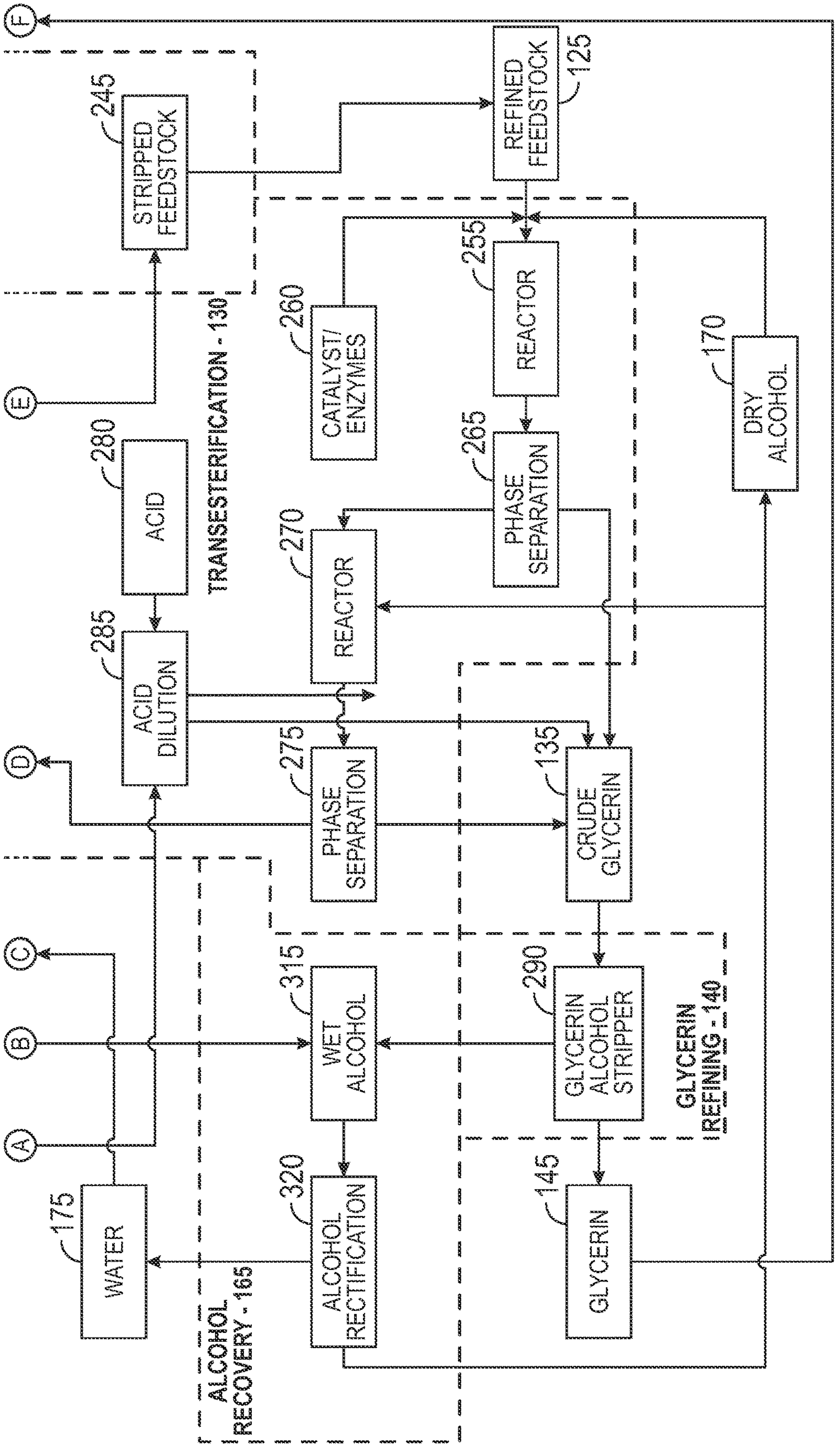

As shown in FIG. 2, the pretreated feedstock 115 may then be subjected to an FFA refining process 120 which converts FFA into glycerides by way of glycerolysis 250. The FFA refining process 120 includes a loop in which FFA and MG are introduced to glycerolysis 250 to convert them to predominantly di- and tri-glycerides then the stream undergoes FFA stripping to separate the fatty acid distillate 240 (which is rich in FFA and MG) from a stripped feedstock 245 (which is rich in di- and tri-glycerides). The fatty acid distillate 240 is recycled back to glycerolysis 250 and the stripped feedstock 245 is a refined feedstock 125 which proceeds to transesterification 130. In some embodiments, the feedstock 115 is introduced to the FFA stripping process 235 before glycerolysis 250. Regardless, processes 235 and 250 are connected in a loop, with the fatty acid distillate 240 from the FFA stripping process 235 being directed to glycerolysis 250 and the stripped feedstock 245 proceeding toward transesterification 130. Refined feedstock 125 undergoes a transesterification process 130 to yield crude biodiesel 150 and crude glycerin 135. Crude glycerin 135 is refined in a glycerin refining unit 140 to yield glycerin 145, which may be recycled into the FFA refining process 120 for glycerolysis 250. Crude biodiesel 150 undergoes a final biodiesel refining process 155 to produce a commercially-acceptable purified biodiesel product 160. Wet alcohol from biodiesel refining 155 and glycerin refining 140 is sent to an alcohol recovery unit 165 to separate water 175 and recover dry alcohol 170. Embodiments of the unit operations of FIG. 1 are described in more detail in FIGS. 2 and 3.

FIG. 2 shows process embodiments similar to the embodiments shown in FIG. 1, except FIG. 2 shows additional embodiments and process steps in more detail. Crude feedstock 105 is stored at the biodiesel production facility. Compatible feedstocks may be combined and stored in a shared tank before they are processed further. Crude feedstocks 105 are pretreated and refined as dictated by their FFA content and other feedstock properties. The pretreated feedstock 115 requires further processing to convert FFA to glycerides before transesterification. FFA in the crude feedstock 105 are generally undesirable in the transesterification process 130 because they form soaps in the oil when they react with the base catalyst used to drive the transesterification reaction. As described below in more detail, the free fatty acid refining process 120 includes chemical conversion of FFA by glycerolysis 250. Glycerolysis is a subcategory of esterification in which glycerol, an alcohol, is used to convert FFA into glycerides, which are fatty acid esters of glycerol. U.S. Pat. No. 7,087,771 (Luxem) includes a more detailed description of glycerolysis and is expressly incorporated by reference. An advantage of this invention over the prior art is that a feedstock with any FFA content (0-100 wt. %) can be processed with the appropriate feedstock pretreatment embodiment 110 and/or FFA refining 120 processes. More specifically, feedstock 105 containing any quantity of FFA can be processed by at least one of the pretreatment 110 and FFA refining 120 methods described in this application, in which FFAs are removed in a chemical refining unit 205, a physical refining unit 235 and/or converted by glycerolysis in a FFA conversion unit 250.

Figure 3:
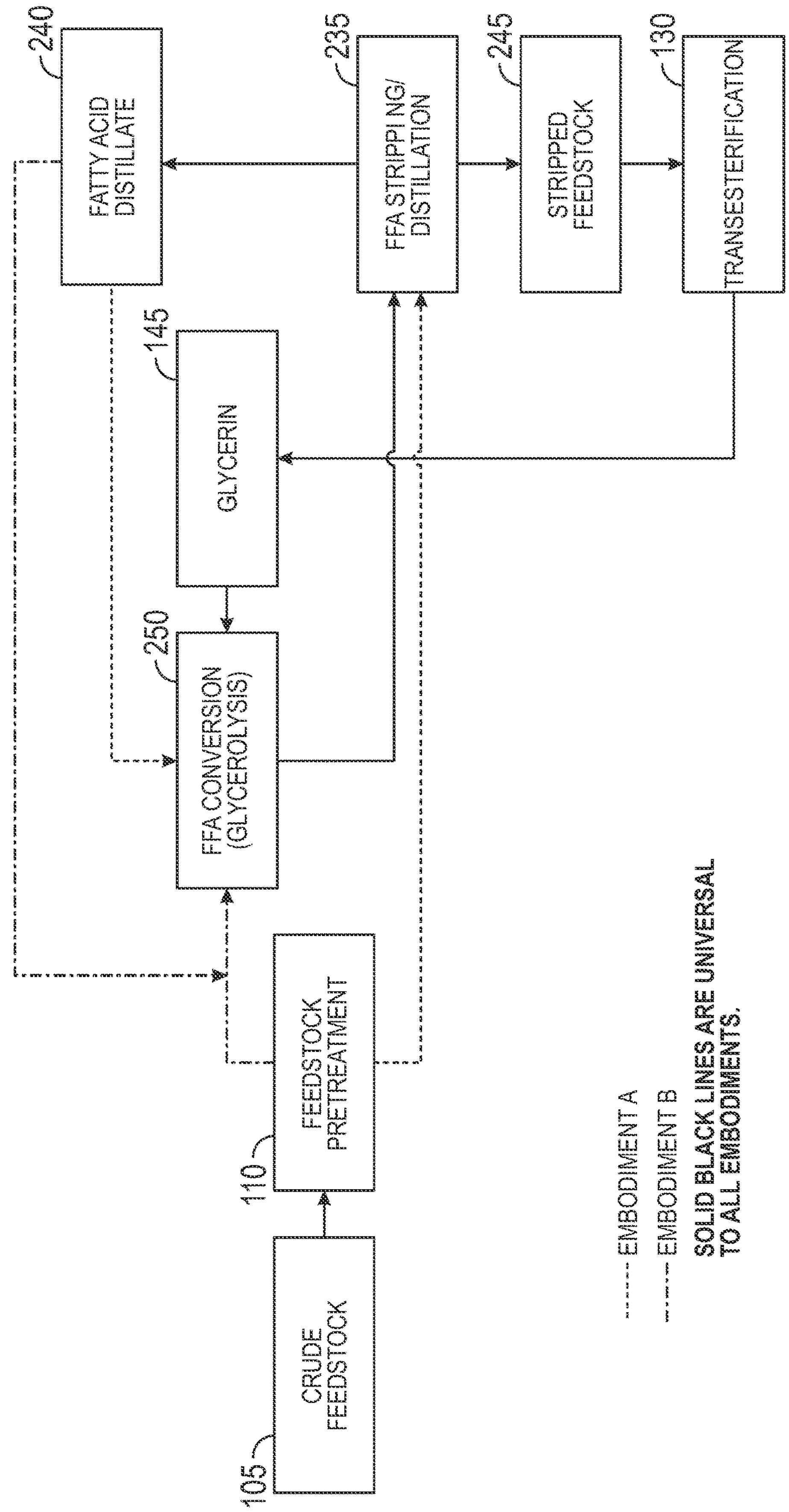
FIG. 3 is a process flow diagram showing more specific embodiments of the free fatty acid refining step shown in FIG. 2.

The embodiments shown in FIGS. 2 and 3 include a FFA refining process 120 with a recycle loop in which the pretreated feedstock 115 is introduced to a first process unit, which includes a FFA stripping process 235 and a glycerolysis process 250. A stream from the first process unit is then introduced to a second process unit, having the other of a FFA stripping process 235 and a glycerolysis process 250. The fatty acid distillate 240 stream from the stripping process 235 is recycled back to the glycerolysis process 250. In one embodiment shown by the solid lines in FFA refining process 120, the pretreated feedstock 115 is stripped of FFAs and other components of low molecular weight (e.g., MG) relative to di- and tri-glycerides in a physical FFA refining step using distillation 235. Although the FFA stripping step can be performed on feedstocks having any FFA level, a preferred FFA level is between about 0.2 wt. % FFA and about 30 wt. % FFA. The FFA stripping step 235 may use steam, hot oil, or other thermal fluid to heat the crude feedstock. The distillation may occur under vacuum pressure to remove FFA from the oil phase by evaporation in unit 235. The FFA stripping step 235 may employ a distillation column, wiped-film evaporator, or other such equipment and may optionally include the injection of steam into the distillation unit to facilitate separation of the FFAs from the remainder of the feedstock. Two product streams can be produced from FFA stripping 235: first, a relatively pure fatty acid distillate 240 made of greater than about 50 wt. % FFA with some MG; and second, the stripped feedstock 245 containing di- and tri-glycerides and less than about 0.5 wt. % FFA. FFA stripping 235 purifies the stripped feedstock stream 245 sufficient to enter the transesterification process as a refined feedstock 125. The fatty acid distillate stream 240 is directed to FFA conversion unit 250 where it undergoes glycerolysis to form mono-, di-, and tri-glycerides. Together with unreacted FFA, the stream coming from the glycerolysis unit 250 is referred to in this application as the "glycerolysis product." In this embodiment, the glycerolysis product is introduced to another FFA stripping unit or recycled back through FFA stripping unit 235 (as shown in FIGS. 2 and 3) to produce a second stripped feedstock 245 and a second fatty acid distillate 240. It should be noted that the reference numbers for the second stripped feedstock 245 and the second fatty acid distillate 240 are the same as for the first stripped feedstock 245 and a first fatty acid distillate 240, respectively, since the process creates a flow loop where the respective streams may be directed to the same process units. The FFA stripping 235 unit receives streams from two different places—one stream from the pretreated feedstock 115 and another stream from the FFA conversion 250 unit. In order to accommodate the second (recycled) stream, some embodiments increase the volume capacity of the FFA stripping 235 unit.

The glycerolysis product may be directed back to pretreated feedstock unit 115 prior to the FFA stripping unit 235, or it may be introduced to the FFA stripping unit 235 directly. The stripped feedstock 245 is separated from the fatty acid distillate 240 during FFA stripping 235, as described above. The first and second stripped feedstocks 245 are moved to refined feedstock 125, which is directed towards transesterification 130 as described in this application. The crude biodiesel 150 produced during transesterification 130 may undergo biodiesel refining 155 as described below. The second fatty acid distillate 240 separated in the FFA stripping unit 235 is then reintroduced to FFA conversion unit 250 to undergo glycerolysis, which converts more FFA and monoglycerides into di- and tri-glycerides and reduces the FFAs in the refined feedstock 125. The fatty acid distillate 240 is continually separated from the stripped feedstock 245 and introduced to the FFA conversion unit 250, then recycled through FFA stripping unit 235 unit to reduce the amount of FFA in the refined feedstock 125. In some embodiments, the stripped feedstock 245 (the products stream) is less than about 5 wt. %, 4 wt. %, 3 wt. %, 2 wt. %, 1 wt. %, 0.5 wt. %, 0.3 wt. % or 0.1 wt. % FFA before entering transesterification as a refined feedstock (125).

A second embodiment shown by the dashed lines in FIGS. 2 and 3 is similar to the embodiment described above, except the refined feedstock 115 is first introduced to glycerolysis unit 250 to convert FFA and MG into di- and tri-glycerides. The glycerolysis product stream is then introduced to stripping 235, where higher molecular weight glycerides are removed as stripped feedstock 245 and proceed toward transesterification while fatty acid distillate 240 is recycled to the glycerolysis unit 250, as described above. The method continues as a loop, with the fatty acid distillate 240 recycled into the glycerolysis process 250 until di- and tri-glycerides are produced and separated into the stripped feedstock stream 245. The loop continues for FFA and other low molecular weight compounds, but high molecular weight glycerides are separated during stripping 235 and continue toward transesterification 130.

In some embodiments, the glycerolysis process 250 described above may be optimized to use less glycerin and increase the production of di- and tri-glycerides while minimizing the combined concentrations of FFA and MG in the glycerolysis product. Glycerin optimization includes "starving" the reaction of glycerin, or using less glycerin than required to convert all of the FFAs to glycerides. Glycerolysis proceeds according to the reaction network shown in FIG. 4, wherein the reaction conditions are such that each of the five reactions proceed primarily in the forward direction.

There are three forward reactions ($R_1$, $R_4$, and $R_5$) that result in the production of MG. These are the only reactions that require free glycerin (FG) as a reactant. Furthermore, as reaction $R_1$ is the primary reaction for conversion of FFA, glycerolysis reaction conditions are traditionally set to promote reaction $R_1$ to produce as low of FFA content as possible. The subsequent implementation of an FFA stripper in the present invention, however, results in low FFA concentrations in the refined feedstock regardless of the extent of FFA conversion in glycerolysis. Therefore, implementing an FFA stripper in the present invention enables the use of lower glycerin doses that are more optimized for the glycerolysis product stream to be fed to an FFA stripper. This optimized glycerin dose "starves" the reaction of FG and promotes the forward reaction of $R_2$ and $R_3$. In turn, the forward reaction of $R_2$ and $R_3$ promotes production of di- and tri-glycerides. MG and unreacted FFA are separated in step 235 and then recycled back into glycerolysis, where they have another opportunity to react with glycerin to form higher molecular weight (di- and tri-) glycerides. The FFA refining process 120 of the present invention allows for less glycerin to be used during glycerolysis because it is not necessary to react all of the FFA in a single glycerolysis process 250.

Once the feedstock has been pretreated 110 and refined 120, it enters the transesterification process 130 and then the biodiesel refining process 155. There are several processes that may be used to produce biodiesel from oils and fats, including base-catalyzed transesterification, acid-catalyzed transesterification, and enzymatic transesterification.

In one embodiment, after the crude biodiesel 150 and crude glycerin 135 have been separated in unit 275, crude glycerin 135 may be treated with a suitable acid from an acid dilution vessel 285 to neutralize the residual catalyst and crude biodiesel 150 can be subjected to a water wash in unit 295 to remove glycerin, salts, and soaps. The separated crude glycerin 135 may be subjected to additional purification in an evaporation step to remove any remaining alcohol. One such distillation and drying step is performed in unit 290. The glycerin alcohol stripper 290 removes alcohol and water, which is collected in a wet alcohol unit 315. Removal of alcohol and water results in a glycerin product consisting of approximately 78 to about 98% pure glycerin. This glycerin 145 can be further refined to a purity of about 99% or higher using additional processing techniques to render the glycerin product suitable for use in high purity applications, such as cosmetics or pharmaceuticals. Alternatively, the glycerin 145 may be used as a reactant for glycerolysis (shown by the dashed line) when the FFA conversion 250 process is glycerolysis.

Crude biodiesel 150 leaving the phase separation unit 275 will still include impurities and therefore must be purified in one or more unit operations. The order and number of these operations may vary depending on crude feedstock properties, pretreatment process, transesterification process, and economic feasibility. However, the combination of an appropriate biodiesel refining process 155 with an appropriate feedstock pretreatment 110 and FFA refining 120 process will provide a purified biodiesel 160 that meets commercial specifications regardless of the initial feedstock properties.

The invention is illustrated in detail below with reference to the example, but without restricting it to them.

EXAMPLES

Example 1: Effect of Glycerin Dose on Glycerolysis

Figure 5:
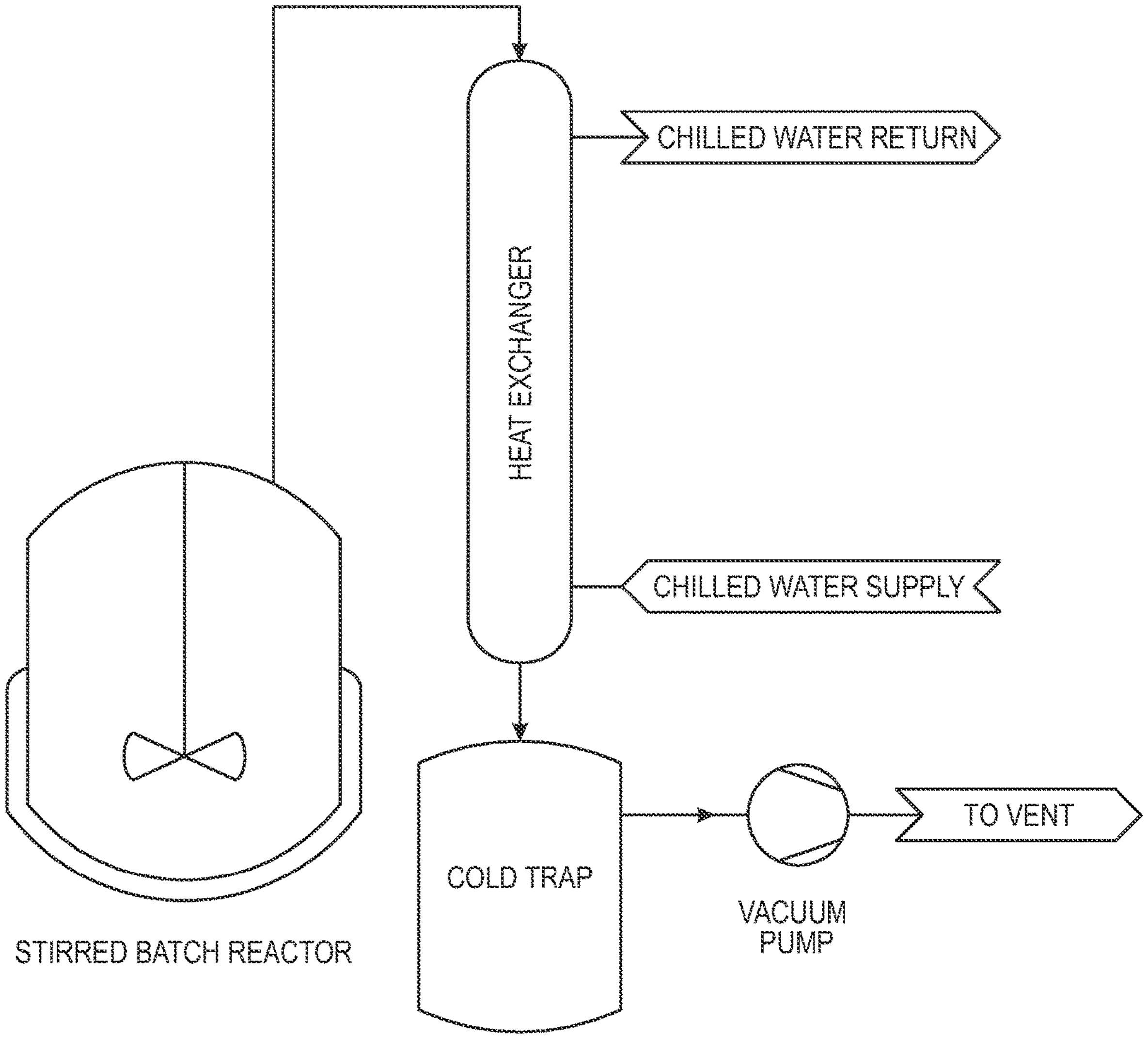
FIG. 5 is a process flow diagram of the lab-scale batch reactor configuration used for glycerolysis experimentation.

A high-FFA feedstock blend was prepared from about 79 wt. % used cooking oil (UCO) and about 21 wt. % fatty acid distillate (FAD). A summary of the key properties of the high-FFA feedstock blend is shown below in Table 1. Refined glycerin was produced by distilling crude glycerin from the production of biodiesel in a wiped film evaporator at about 180° C. and 16 mbar. The composition of the refined glycerin is shown in Table 2. The effect of glycerin dose on glycerolysis performance was evaluated by dosing the high-FFA feedstock blend with refined glycerin at dose rates ranging from 0 to 0.31 molar equivalents to the total fatty acids present in the high-FFA feedstock blend (MEq-TFA). The dose rate of glycerin was determined on a MEq-TFA basis according to the following equation:

$$MEq = \frac{[G]\cdot P}{MW_G} \Big/ \left(\frac{[FFA]}{MW_{FFA}} + \frac{[TG]}{3\cdot MW_{TG}} + \frac{[DG]}{2\cdot MW_{DG}} + \frac{[MG]}{MW_{MG}}\right)$$

where:

[G]=Mass concentration of glycerin in glycerolysis feed
P=Glycerin purity (e.g., 95%)
$MW_G$=Molecular weight of glycerol
[FFA]=Mass concentration of free fatty acids in glycerolysis feed
$MW_{FFA}$=Molecular weight of oleic acid
[TG]=Mass concentration of triglycerides in glycerolysis feed
$MW_{TG}$=Molecular weight of triolein
[DG]=Mass concentration of diglycerides in glycerolysis feed
$MW_{DG}$=Molecular weight of diolein
[MG]=Mass concentration of monoglycerides in glycerolysis feed
$MW_{MG}$=Molecular weight of monoolein The glycerin-dosed feedstock was then reacted in a lab-scale stirred-batch reactor at conditions of 230° C. and 300 mbar for about 4 hours. A block flow diagram for the lab-scale reactor system used for this study is shown in FIG. 5. The stirred batch reactor consisted of a 1000 mL round-bottom flask placed on an electric heating mantle, which maintained the liquid temperature by a PID controller. A magnetic stir bar was added to the flask and stirred at approximately 500 rpm by a magnetic drive throughout the entirety of the reaction. A glass tube-in-tube heat exchanger was connected to the outlet of the stirred batch reactor in a downward direction such that any condensate that was collected in the heat exchanger flowed into the cold trap. Chilled water was maintained at 10° C. and was pumped through the shell-side of the heat exchanger. The cold trap was a 3-port 500 mL round bottom flask with the heat exchanger entering through one port and a vent line connected to another port. The third port was plugged. The vent was plumbed to a vacuum pump. The vacuum pump discharge was routed to a ventilation hood.

TABLE 1

Properties of the UCO/FAD blended composition.

| Property | Units | Blended Composition |
|---|---|---|
| FFA | Wt. % | 24.5% |
| Alkalinity | ppm | 590 |
| Moisture | Wt. % | 1.32% |
| Fatty Acid Methyl Esters | Wt. % | 0.03% |
| Monoglycerides | Wt. % | 0.6% |
| Diglycerides | Wt. % | 4.7% |
| Triglycerides | Wt. % | 68.0% |
| Free Glycerin | Wt. % | 0.7% |
| Steryl Esters | Wt. % | 1.5% |
| Sterols | Wt. % | 0.1% |

TABLE 2

Properties of refined glycerin.

| Property | Units | Composition |
|---|---|---|
| Glycerol Content | Wt. % | >95% |
| Moisture | Wt. % | <2% |
| Methanol | Wt. % | <0.1% |
| Ash | Wt. % | <0.3% |
| Total Fatty Acid | Wt. % | <1% |

Figure 6:
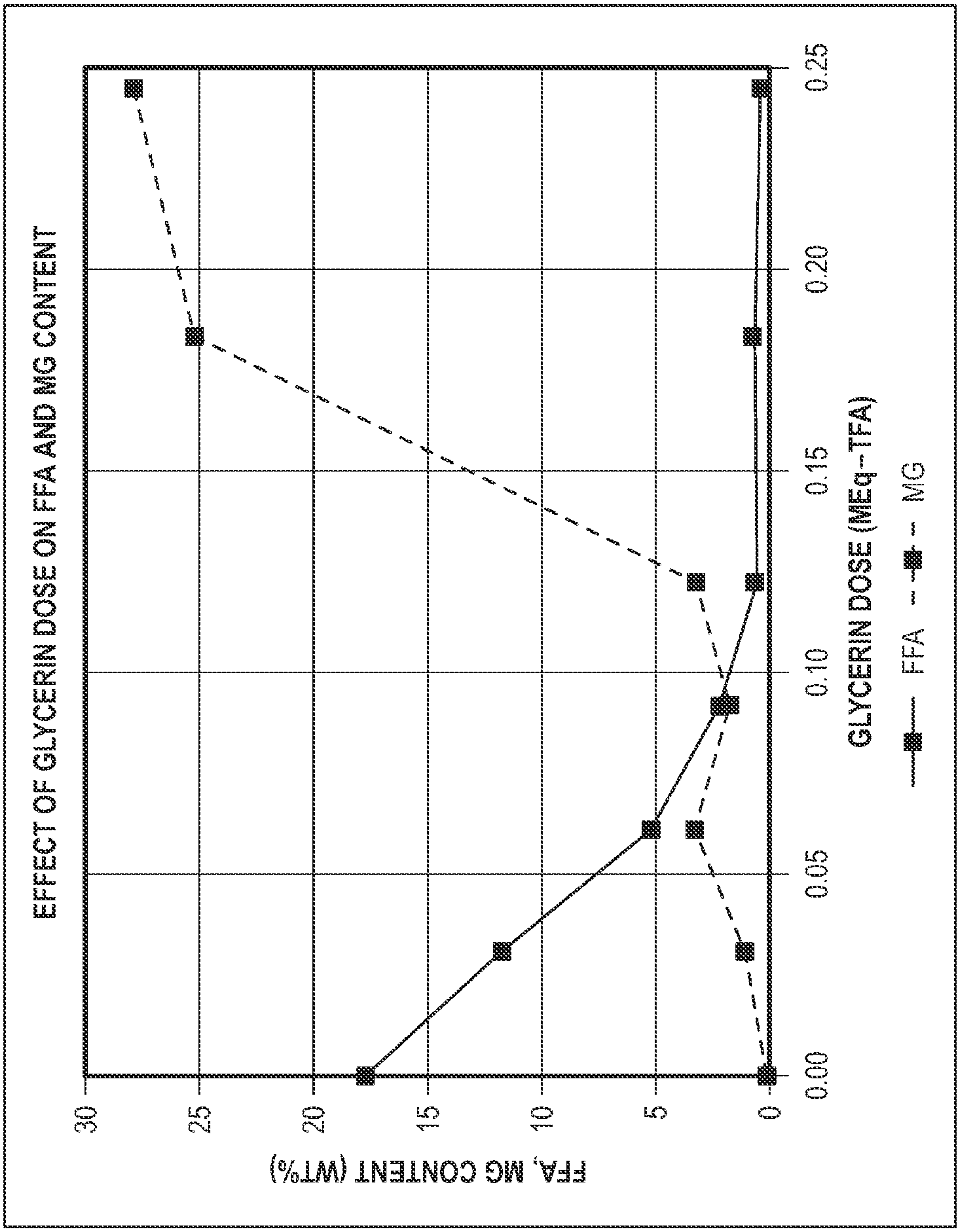
FIG. 6 is a graph showing the effect of glycerin dose on the FFA and MG content of glycerolysis products.
Figure 7:
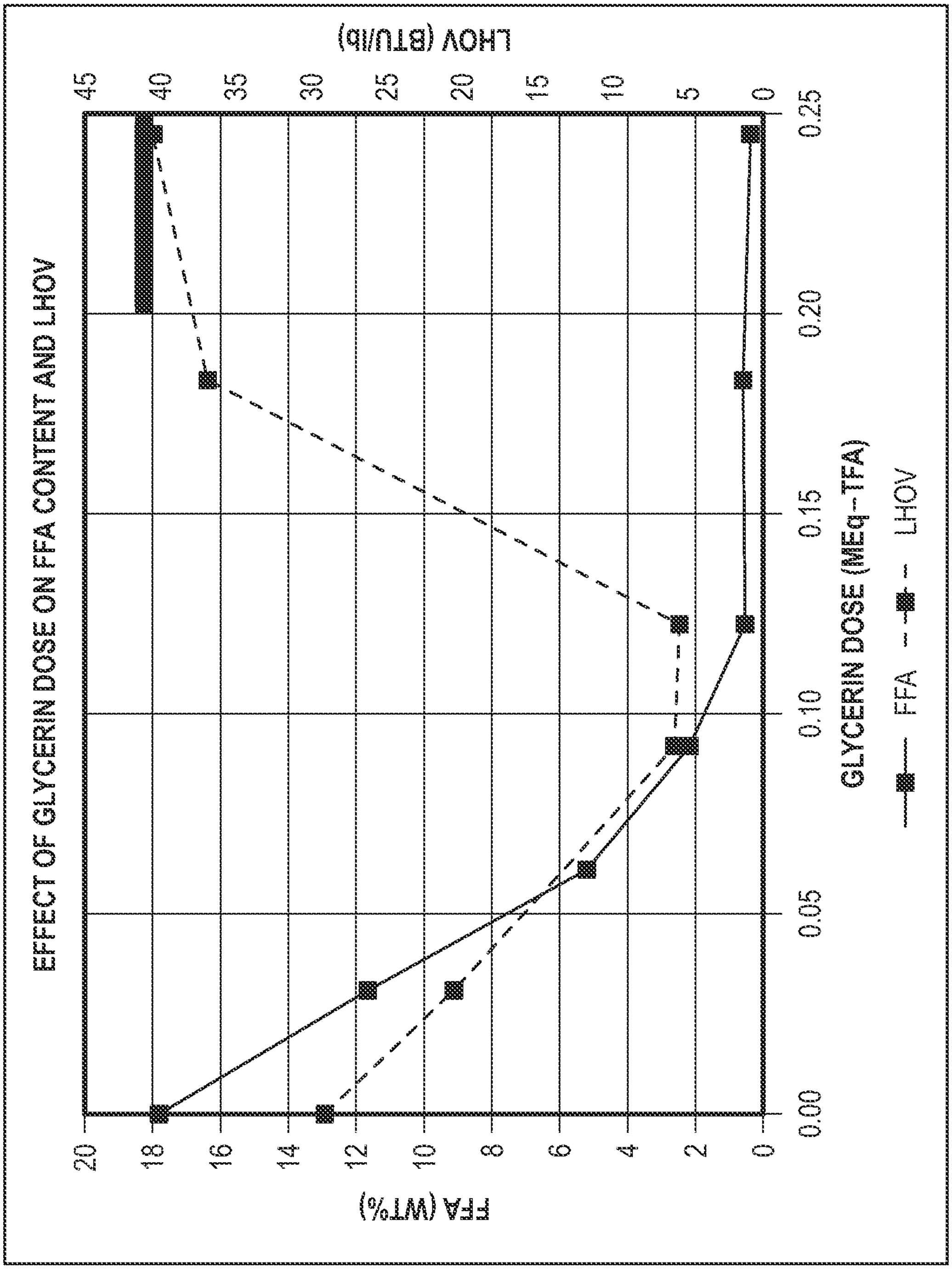
FIG. 7 is a graph showing the effect of glycerin dose on the concentration of FFA and the corresponding latent heat of vaporization assuming the complete removal of FFA and MG during FFA stripping.

After conducting the glycerolysis experiments as described above, the glycerolysis product composition was analyzed for FFA and glycerides to determine the effect of the glycerolysis treatment. The results of these analyses are shown below in Table 3. Interestingly, there was a reduction of 6.7 wt. % in FFA even when no glycerin was added to the reactor. As the dose rate of refined glycerin was increased, the FFA of the glycerolysis product decreased, as shown in FIG. 6, until the FFA content was reduced to less than about 1 wt. %, which occurred at glycerin dose rates more than about 0.10 MEq-TFA. FIG. 6 demonstrates that once the FFA content of the glycerolysis product was reduced to below 1 wt. %, the concentration of MG began to increase substantially.

TABLE 3

FFA and glycerides composition of the glycerolysis product at varying glycerin dose rates.

| Glycerin Dose (MEq-TFA) | FFA (wt %) | MG (wt %) | DG (wt %) | TG (wt %) |
|---|---|---|---|---|
| 0.00 | 17.8% | 0.1% | 5.0% | 75.0% |
| 0.03 | 11.7% | 1.1% | 14.5% | 72.7% |
| 0.06 | 5.2% | 3.3% | 16.4% | 71.6% |
| 0.09 | 2.2% | 1.7% | 17.8% | 77.0% |

TABLE 3-continued

FFA and glycerides composition of the glycerolysis product at varying glycerin dose rates.

| Glycerin Dose (MEq-TFA) | FFA (wt %) | MG (wt %) | DG (wt %) | TG (wt %) |
|---|---|---|---|---|
| 0.12 | 0.6% | 3.2% | 30.6% | 60.7% |
| 0.18 | 0.7% | 25.3% | 42.0% | 24.6% |
| 0.24 | 0.4% | 27.9% | 37.2% | 29.8% |

Traditionally, glycerolysis is optimized to produce a feedstock characterized by a low concentration of FFA. In the present invention, however, where glycerolysis is optimized to feed FFA distillation, the latent heat of the glycerolysis product must also be considered. FIG. 4 shows the trade-off between achieving low-FFA and low latent heat of vaporization (LHOV) of the feedstock: as the FFA content decreases to optimal levels (e.g., <1 wt. %), the LHOV increases substantially. The LHOV was calculated for the volatile components, FFA and MG, based on the composition and LHOV of each. The LHOV neat of FFA, assumed to be oleic acid, and MG, assumed to be monoolein, was 163.5 BTU/lb and 142.7 BTU/lb, respectively. When high (>0.18 MEq-TFA) glycerin doses were used, the LHOV of the glycerolysis product increased to more than 37 BTU/lb. This trade-off between FFA reduction and MG creation is problematic when attempting to distill the FFA from the glycerolysis product because the low volatility of MG also results in carryover of MG, and therefore increased LHOV load, in an FFA-distillation step.

As a result of the high degree of variability in the identity and quantity of impurities found in feedstocks for biodiesel, particularly low-cost crude feedstocks, a number of process steps as disclosed in the embodiments of the invention may be employed as disclosed to convert highly impure feedstock into high-quality, fully-acceptable biodiesel. These various embodiments are described in sufficient detail to enable one of ordinary skill in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the principles of the invention. Additionally, certain steps may be performed concurrently in a parallel process when possible, as well as performed sequentially.

All publications, patents, and patent applications cited in this specification are incorporated by reference in their entirety as if each publication, patent, or patent application were specifically and individually put forth in this application.

The embodiments, variations, and figures described above indicate the utility and versatility of the present invention. Other embodiments that do not provide all of the features and advantages set forth in this application may also be utilized without departing from the spirit and scope of the present invention. Such modifications and variations are considered to be within the scope of the principles of the invention defined by the claims.

What is claimed is:

1. A method for producing biodiesel from a feedstock containing free fatty acids (FFAs) and monoglycerides, said method comprising:

a. introducing the feedstock to a glycerolysis process, wherein the glycerolysis process converts free fatty acids (FFAs), free glycerin, and monoglycerides into a glycerolysis product having a mixture of mono-, di-, and tri-glycerides and unreacted FFAs, wherein the free glycerin is introduced to the glycerolysis process at a dose rate of about 0.12 MEq-TFA or less;

b. introducing the glycerolysis product to a free fatty acid (FFA) stripping process, wherein the FFA stripping process separates the glycerolysis product into a stripped feedstock stream and a fatty acid distillate stream;

c. introducing the fatty acid distillate stream to the glycerolysis process of step (a).

2. The method of claim 1, wherein the feedstock is a pretreated feedstock.

3. The method of claim 1, wherein the stripped feedstock stream comprises di- and tri-glycerides.

4. The method of claim 1, wherein the fatty acid distillate stream comprises FFAs and monoglycerides.

5. A product produced by the process of claim 1.

6. A method for producing biodiesel from a feedstock containing free fatty acids (FFAs), said method comprising the steps of:

a. converting FFA in the feedstock to a glycerolysis product using a glycerolysis process, wherein the glycerolysis process includes introducing free glycerin at a dose rate of about 0.12 MEq-TFA or less;

b. separating the glycerolysis product into a fatty acid distillate and a stripped feedstock using a free fatty acid stripping process; and c. introducing the fatty acid distillate to one of either the glycerolysis process in step (a) or a subsequent (second) glycerolysis process.

7. The method of claim 6, further comprising converting the stripped feedstock to a first crude biodiesel using a transesterification process.

8. The method of claim 6, wherein the feedstock and the glycerolysis product are simultaneously introduced to the fatty acid stripping process.

9. The method of claim 7, further comprising distilling the first crude biodiesel to produce a purified biodiesel and a distillation bottoms.

10. The method of claim 6, further comprising the step of pretreating the feedstock to produce a pretreated feedstock and using the pretreated feedstock as the feedstock in step (a).

11. The method of claim 6, wherein the feedstock comprises at least one of distillers corn oil, palm oils, fatty acid distillates, biodiesel distillation bottoms, yellow grease, brown grease, poultry fat, used cooking oil, pennycress oil, algae oil, soybean oil, beef tallow, choice white grease, canola oil and combinations thereof.

12. The method of claim 6, wherein the glycerolysis product includes mono-di- and tri-glycerides as well as un-reacted FFA.

13. A product produced by the process of claim 6.

14. A method for producing biodiesel from a feedstock containing free fatty acids (FFAs), said method comprising:

d. using a stripping process to separate the feedstock into a stripped feedstock and a fatty acid distillate, wherein the stripped feedstock comprises di-glycerides and tri-glycerides and the fatty acid distillate comprises FFAs and monoglycerides;

e. using a glycerolysis process which includes introducing free glycerin to convert FFAs in the fatty acid distillate to a glycerolysis product comprising unreacted FFAs, mono-glycerides, di-glycerides, and tri-glycerides, wherein the free glycerin is introduced to the glycerolysis process at a dose rate of about 0.12 MEq-TFA or less;

f. introducing the glycerolysis product to one of either the stripping process in step (a) or a subsequent (second) stripping process to separate the glycerolysis product into a second stripped feedstock and a second fatty acid distillate;

g. transesterifying the first stripped feedstock and the second stripped feedstock to produce a first crude biodiesel.

15. The method of claim 14, further comprising distilling the first crude biodiesel to produce a purified biodiesel and a distillation bottoms.

16. The method of claim 14 further comprising the step of pretreating the feedstock to produce a pretreated feedstock and using the pretreated feedstock as the feedstock in step (a).

17. The method of claim 14, wherein the feedstock comprises at least one of distillers corn oil, palm oils, fatty acid distillates, biodiesel distillation bottoms, yellow grease, brown grease, poultry fat, used cooking oil, pennycress oil, algae oil, soybean oil, beef tallow, choice white grease, canola oil or combinations thereof.

18. A product produced by the process of claim 14.

19. The method of claim 1, wherein the amount of monoglycerides in the glycerolysis product is 3.2 wt. % or less.

20. The method of claim 1, wherein the ratio of the sum of di-glycerides and triglycerides to FFAs and monoglyceride in the glycerolysis product is between about 4.5 and 24.

21. The method of claim 1, wherein the ratio of the sum of di-glycerides and triglycerides to monoglycerides in the glycerolysis product is greater than about 2.6.

* * * * *